July 2, 1946.        B. J. CRAIG        2,403,265
METHOD OF MAKING CELLULAR SYSTEMS
Filed Dec. 28, 1943

INVENTOR.
Burnie J. Craig

UNITED STATES PATENT OFFICE 2,403,265

METHOD OF MAKING CELLULAR SYSTEMS

Burnie J. Craig, Los Angeles County, Calif.

Application December 28, 1943, Serial No. 516,133

1 Claim. (Cl. 18—56)

This invention relates to a novel method of making a cellular system.

The general object of the invention is to provide a novel method of making an energy storing and releasing cellular system.

A more specific object of the invention is to provide a novel method of making a strip which includes gas containing pockets and portions integral with the pockets and connecting the pockets.

Other objects and advantages of the invention will be apparent from the following description taken in connection with the accompanying drawing, wherein.

This application is a division of application Serial No. 337,890, filed May 29, 1940.

In the disclosure herein the novel method is employed in the making of a strip 28 of material comprising spaced pocket or cell members 28' joined by integral connecting portions 28''.

In order to practice the method a novel apparatus, indicated at 35, may be employed. As shown the apparatus includes upper and lower drums 36 and 37 which are suitably supported for rotation. Each drum is hollow and mounted on a hollow shaft 38 which communicates with the interior of the drum and with the atmosphere.

Figure 2:
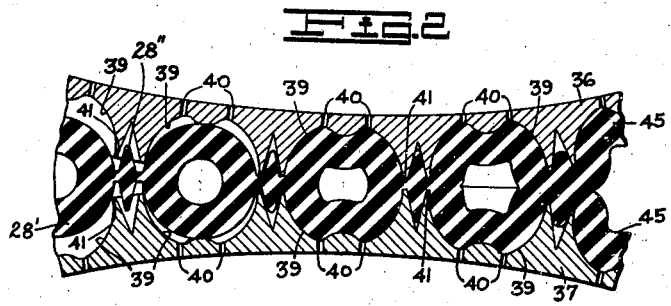
Fig. 2 is an enlarged fragmentary sectional view showing the mold member with a cellular strip therein.
Figure 3:
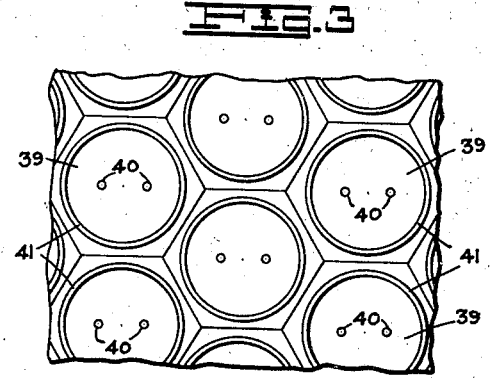
Fig. 3 is an enlarged plan development of one of the mold members.

As shown in Figs. 2 and 3 each of the drums is provided on its exposed surface with a plurality of substantially hemispherical mold cavities 39 which communicate through holes 40 with the interior of the drum. Each mold cavity 39 is surrounded by a more or less sharpened peripheral edge portion 41. The portions 41 on the two drums are in substantial engagement where the drums are tangent.

The apparatus 35 is preferably arranged in a room 42 where air under pressure is maintained. Access to the room 42 may be through a suitable airlock 43. The apparatus 35 includes supports 44 for rolls of rubber, plastic material, or other stock 45 and the construction is such that when the drums 36 and 37 are rotated the stock 45 is carried about the drums.

The drums being hollow and being bled through the hollow shafts, the interior of the drums is under less pressure than the exterior thereof so that the stock 45 being more or less plastic is forced by the compressed air into the mold cavities 39 and rotates with the drum until the edge portions 41 contact whereupon the two halves are squeezed together as shown in Fig. 8. The drums may be heated so that a slight cure results as the drums rotate. The stock with the pocket members 28' connected by the portions 28'' passes from the drums and is carried on supporting devices 46 through a vulcanizer 47.

The making of the strip 28 having occurred in a room filled with compressed air, the pockets when finished are inflated by the contained air, the pressure of which has been predetermined.

Figure 1:
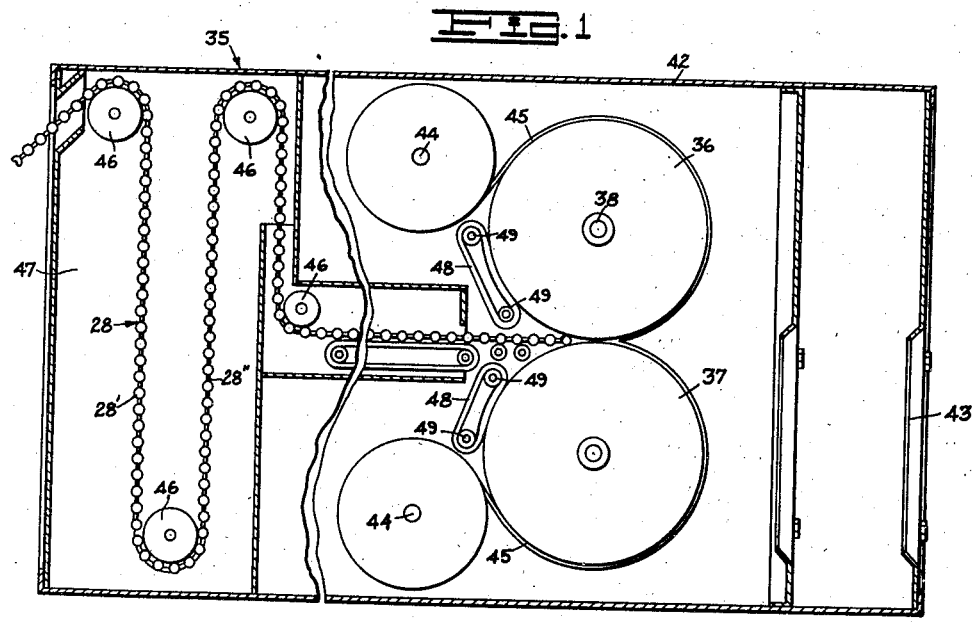
Fig. 1 is a sectional view, partly in elevation and partly diagrammatic, showing an apparatus for practicing the method disclosed herein.

In order to prevent excess leakage through the holes 40 which are not sealed by the sheet stock, endless elastic belt members 48 (see Fig. 1) may be employed. These members pass over rollers 49 and are dragged along by the adjacent drums so that the holes 40 beneath the belts 48 are closed thus reducing the leakage.

The pocket members 28' are compressible as well as resilient and elastic due to the contained gas. The size of the pocket members may be suitably varied. Also the pressure within the pocket members, their wall thickness, resiliency, elasticity, etc., will be suitably determined by the requirements. The specific gravity of the strip may be varied as required.

As an illustration of material the artificial rubber known as "Neoprene" may be employed.

While the embodiment of the present invention as herein disclosed constitutes a preferred form, it is to be understood that other forms might be adopted, all coming within the scope of the claim which follows.

Having thus described my invention, I claim:

1. The method of making a strip of connected cellular members which comprises providing a source of raw material, the raw material being capable of being cured to form connected, gas impervious, flexible pockets, advancing raw material from the source, forming the raw material into a cellular system which comprises integrally connected, independent, spaced gas containing pockets with the gas in the pockets at a pressure above that of the atmosphere, and thereafter advancing the strip of raw material with the formed pockets therein from the forming region while it is subjected to a pressure which is above atmospheric and which is sufficiently high with respect to the gas pressure within the pockets to prevent blowing out of the pockets and curing the raw material which has been formed into a cellular system while subjected to a pressure which is above atmospheric and which is sufficiently high with respect to the gas pressure within the pockets to prevent blowing out of the pockets.

BURNIE J. CRAIG.